United States Patent
Haas et al.

(10) Patent No.: US 11,644,335 B2
(45) Date of Patent: May 9, 2023

(54) SERVICE AREA COVERAGE FOR AUTONOMOUS VEHICLE FLEETS

(71) Applicant: GM Cruise Holdings LLC, San Francisco, CA (US)

(72) Inventors: Patrick Tyler Haas, San Francisco, CA (US); Charles Bruce Matlack, San Francisco, CA (US); Sarah M. Rizk, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 133 days.

(21) Appl. No.: 17/213,405

(22) Filed: Mar. 26, 2021

(65) Prior Publication Data

US 2022/0307856 A1  Sep. 29, 2022

(51) Int. Cl.
| | |
|---|---|
| *G06F 3/048* | (2013.01) |
| *G01C 21/36* | (2006.01) |
| *G06F 16/23* | (2019.01) |
| *G06F 16/29* | (2019.01) |
| *G01C 21/00* | (2006.01) |
| *G05D 1/02* | (2020.01) |
| *G06F 3/14* | (2006.01) |
| *G06F 3/04842* | (2022.01) |

(52) U.S. Cl.
CPC ..... *G01C 21/3697* (2013.01); *G01C 21/3664* (2013.01); *G01C 21/3691* (2013.01); *G01C 21/3841* (2020.08); *G05D 1/0214* (2013.01); *G05D 1/0291* (2013.01); *G06F 3/14* (2013.01); *G06F 16/2379* (2019.01); *G06F 16/29* (2019.01); *G06F 3/04842* (2013.01)

(58) Field of Classification Search
CPC ............ G01C 21/3697; G01C 21/3841; G01C 21/3664; G01C 21/3691; G06F 16/2379; G06F 16/29; G06F 3/14; G06F 3/04842; G05D 1/0214; G05D 1/0291
See application file for complete search history.

(56) References Cited

U.S. PATENT DOCUMENTS

| | | | |
|---|---|---|---|
| 10,446,037 B2 * | 10/2019 | Kentley-Klay | G06V 20/58 |
| 10,571,283 B1 * | 2/2020 | Nepomuceno | G01C 21/3804 |
| 10,681,513 B2 * | 6/2020 | Iagnemma | G08G 1/0133 |
| 10,713,943 B1 * | 7/2020 | Mubarek | G07C 5/008 |
| 11,429,843 B2 * | 8/2022 | Dancel | G06V 20/58 |
| 11,454,971 B2 * | 9/2022 | Telpaz | G06N 20/00 |
| 11,465,611 B2 * | 10/2022 | Hewitt | G06N 3/044 |
| 11,482,099 B2 * | 10/2022 | White | G08G 1/0125 |
| 11,500,380 B2 * | 11/2022 | Wray | G08G 1/096725 |

(Continued)

OTHER PUBLICATIONS

PCT International Search Report and Written Opinion dated Dec. 14, 2021 in PCT/US2021/048355; 12 pages.

*Primary Examiner* — David Phantana-angkool
(74) *Attorney, Agent, or Firm* — Akona IP

(57) ABSTRACT

A map database stores data describing a set of connected roadways, each having one or more lanes. A coverage system selects lanes from the map database along which AVs can stop, such as parking lanes. The coverage system generates buffer regions for each of the stopping lanes, where each buffer region includes an area within a given distance of the respective lane. The coverage system combines the buffer regions to generate a coverage area, and provides a display of the coverage area overlayed over a map of roads corresponding to the coverage area.

20 Claims, 5 Drawing Sheets

(56) References Cited

U.S. PATENT DOCUMENTS

| | | | | |
|---|---|---|---|---|
| 11,507,196 B2* | 11/2022 | Böhm | .................... | B60K 35/00 |
| 2016/0209845 A1* | 7/2016 | Kojo | ....................... | G01C 21/34 |
| 2018/0033310 A1* | 2/2018 | Kentley-Klay | ........ | G01C 21/34 |
| 2018/0113455 A1* | 4/2018 | Iagnemma | .............. | H04W 4/70 |
| 2018/0113456 A1* | 4/2018 | Iagnemma | ............ | G08G 1/0112 |
| 2018/0113457 A1* | 4/2018 | Iagnemma | ............ | B60W 30/00 |
| 2018/0113463 A1* | 4/2018 | Iagnemma | ............ | G06Q 10/047 |
| 2018/0113470 A1* | 4/2018 | Iagnemma | ............ | G01C 21/30 |
| 2019/0026886 A1* | 1/2019 | Ferguson | ............. | G05D 1/0297 |
| 2019/0047584 A1* | 2/2019 | Donnelly | ............ | B60W 30/025 |
| 2019/0368882 A1* | 12/2019 | Wheeler | ............ | G01C 21/3635 |
| 2020/0192382 A1* | 6/2020 | Pandit | .................... | G06Q 50/30 |
| 2020/0304974 A1* | 9/2020 | Iagnemma | .............. | H04W 4/70 |

* cited by examiner

SERVICE AREA COVERAGE FOR AUTONOMOUS VEHICLE FLEETS

TECHNICAL FIELD OF THE DISCLOSURE

The present disclosure relates generally to autonomous vehicles and, more specifically, to methods and systems for determining service area coverage for autonomous vehicles and displaying service area coverage to users.

BACKGROUND

Fleets of autonomous vehicles (AVs) can provide various travel services, such as passenger transport and delivery transport. The AVs carry out such services by autonomously driving along a network of interconnected roads. The AVs may not be able to travel on certain roads, e.g., if a road is temporarily closed, or if the road is unsuitable for the AV to travel on due to low visibility, poor condition, high pedestrian activity, or other factors. Furthermore, the AVs may only be able to stop along certain roads or at certain locations, e.g., an AV can only stop along a road if there is a suitable stopping lane or parking space. These limitations may not be immediately apparent to users. For example, due to stopping restrictions, an AV may drop a passenger off 500 meters from the passenger's destination. If the user expected door-to-door service, the drop-off location reduces the user's perceived quality of service. As another example, a user may routinely order food delivery from a certain restaurant, but due to road closures, an AV cannot provide delivery service from the restaurant to the user's house, or the delivery may be significantly delayed. This also reduces the perceived quality of service.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
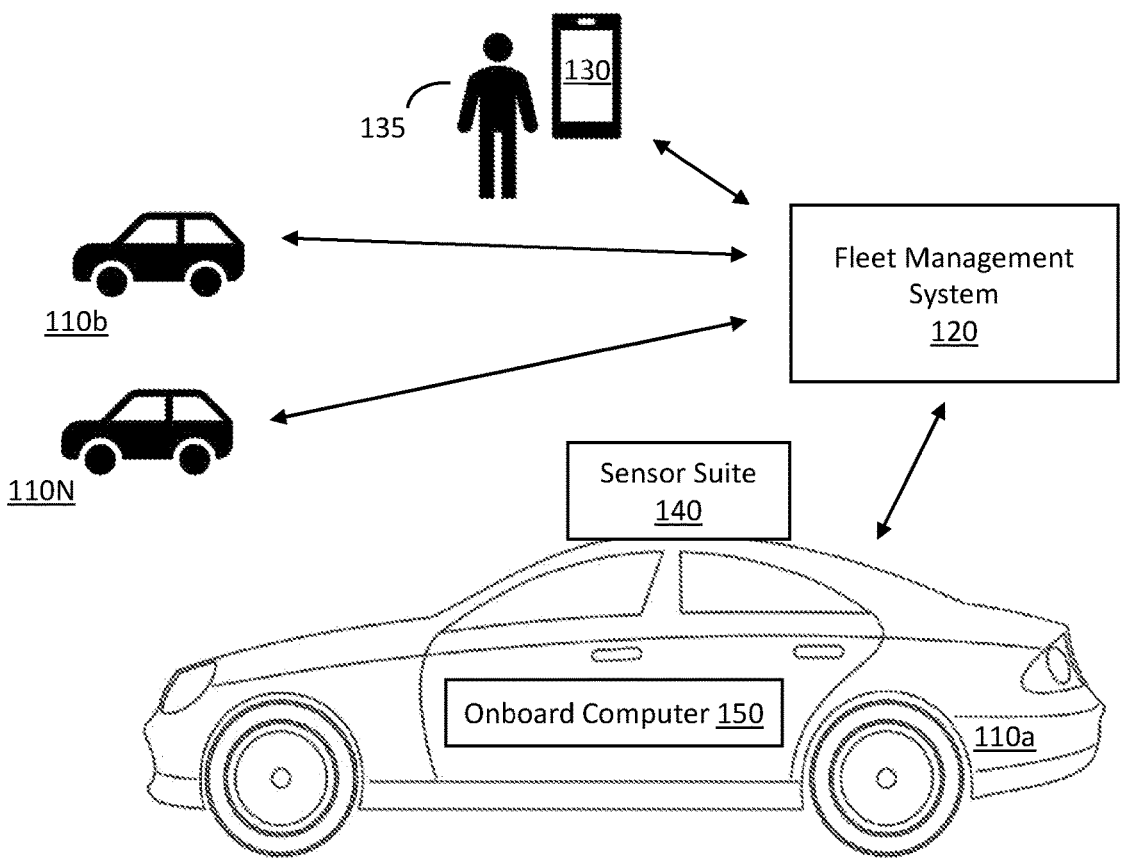
FIG. 1 is a block diagram illustrating a system including an example AV fleet and fleet management system for determining service coverage according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs travel between locations on networks of roads. The road network may include public roads (e.g., city streets, highways, etc.) and private roads (e.g., driveways and other roads on private property). The road network may also include parking areas, such as parking spaces or parking lots, and other types of surfaces on which the AV may drive. Road networks are dynamic, with new roads being added to the network, and roads or lanes being closed due to construction or events. Such changes affect the areas that AVs can reach, including how quickly AVs can travel between locations, and how close AVs can get to certain locations.

When AVs perform services for users, users generally expect AVs to drive from a specific location (e.g., a pickup location of a passenger, or a restaurant with food for delivery) to a specific location (e.g., a drop-off location for the passenger, or a requested drop-off location for the food delivery). Changes in the road network affect whether AVs can follow a specific route, and how close the AVs can get to each of the specific locations. In addition to the changes to the road network, described above, the AV may only be able to stop in certain areas, such as legal parking spots, or along roads where through-traffic can navigate around the AV. Whether an AV can navigate to and stop at a particular location, or within a walkable distance of the location, may not be intuitive to a user, and it can be highly dependent the current state of the road network. Furthermore, the distance users are willing to walk between the AV and their origin or destination point can vary widely between users and between different use cases.

As described herein, an AV system can determine a coverage area for AVs. The coverage area corresponds to a geographic area that is within a particular distance of the locations where the AV can stop, e.g., within a 100 meter or 500 meter walking distance of the locations where the AV can stop. Locations within the coverage area are also referred to herein as "reachable" locations. The AV system generates and maintains a detailed and frequently updated map database that describes the roads on which the AV can drive. AVs use this map database to assist with driving and navigation. In addition, a coverage system uses the map database to deterministically generate the coverage area.

To determine the coverage area, the coverage system selects portions of the roads along with the AV can stop, such as parking lanes or other areas where the AV can pull off the road. The coverage system generates buffer regions along each of the selected portions of the roads. The buffer regions include areas within a particular distance from the selected portions of the roads, e.g., areas that are within a certain walking distance. The coverage system combines the buffer regions, de-duplicating overlapping portions, to generate the coverage area. The coverage area can be updated or re-calculated as the map data changes, e.g., as roads or lanes close or open. In an AV fleet system, AVs on the road may transmit updates to the AV system describing observed changes to the road network. This enables the AV system to update the map database based on current observations and recalculate the coverage area for the AV fleet based on the updated data.

The coverage system or a user interface (UI) system may provide the coverage area in various formats to users. For example, the AV system can provide a service coverage map showing the current coverage area of an AV fleet overlayed on a road map of a particular city or region. The UI may allow a user to select a different walking distance, and the AV system provides an updated coverage map reflecting the selected walking distance. The UI may display multiple overlayed coverage areas, each corresponding to a different walking distance, or a graduated coverage area that varies color, shading, or other visual characteristics as walking distance changes. In another example, in addition or instead of showing real-time coverage, the coverage system may access historical map data and determine how often a particular location or set of locations are reachable by the AV.

Embodiments of the present disclosure provide a method for determining and displaying a coverage area, and a computer-readable medium for performing the method. The method includes selecting, from a map database storing data describing a set of connected roads each having one or more lanes, a plurality of lanes along which an AV can stop; generating a plurality of buffer regions, each buffer region corresponding to a respective lane of the plurality of lanes and including an area within a particular distance from the lane; combining the plurality of buffer regions to generate a coverage area; and providing a display of at least a portion of the coverage area overlayed on a map of roads corresponding to at least a portion of the set of connected roads in the map database.

Embodiments of the present disclosure provide a system having a map database and computer circuitry. The map database stores data describing a graph of connected lanes and, for each of the lanes, data indicating whether an AV of an AV fleet is permitted to stop along the lane. The navigation system is configured to filter the data in the map database to select lanes along which an AV of the AV fleet is permitted to stop; for each of the selected lanes, generate a buffer region including an area within a particular distance from the selected lane; and combine the buffer regions to generate a coverage area for the AV fleet.

As will be appreciated by one skilled in the art, aspects of the present disclosure, in particular aspects of generating and displaying service coverage areas for AVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV System for Determining Service Coverage

FIG. 1 is a block diagram illustrating a system 100 including an example AV fleet and fleet management system for determining service coverage according to some embodiments of the present disclosure. The system 100 includes a fleet of autonomous vehicles (AVs) 110, including AV 110a, AV 110b, and AV 110N, a fleet management system 120, and a user device 130. For example, a fleet of AVs may include a number N of AVs, e.g., AV 110a through AV 110N. AV 110a includes a sensor suite 140 and an onboard computer 150. AVs 110b through 110N also include the sensor suite 140 and onboard computer 150. A single AV in the fleet is referred to herein as AV 110, and the fleet of AVs is referred to collectively as AVs 110.

The fleet management system 120 receives service requests for the AVs 110 from user devices, such as user device 130. For example, the user 135 accesses an app executing on the user device 130 and, using the app, enters a ride request including a pickup location and a drop-off location. The fleet management system 120 dispatches AVs 110 to carry out the service requests. The fleet management system 120 also maintains a map database. When an AV 110 is dispatched for a service request, the fleet management system 120 and/or the AV 110 determines a route for the AV 110 to follow based on the data in the map database, including locations at which the AV 110 can stop for user interactions, such as a user entering or exiting the AV 110, or loading or unloading items from the AV 110. For example, the fleet management system 120 or AV 110 determines a particular location where the AV 110 can stop to pick up or drop off a passenger, or where the AV 110 can stop so that a user can access the AV 110 to collect a delivery item.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. For example, the onboard computer 150 maneuvers the AV 110 according to routing selections determined by an onboard or remote navigation system. The onboard computer 150 also collects data describing roads on which the AV 110 travels or in the vicinity of the AV 110 and transmits the collected data to the fleet management system 120, which may incorporate the collected data into the map database.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110a) to autonomously drive to a particular location (e.g., a pickup address or a delivery address). If the AV 110 cannot drive directly to a particular address or location, or cannot stop at the location, the fleet management system 120 may select a nearby location where the AV 110 can drive to and stop. The fleet management system 120 may select a route for the AV 110 to follow. The fleet management system 120 also manages fleet maintenance tasks, such as charging and servicing of the AVs 110.

As shown in FIG. 1, each of the AVs 110 communicates with the fleet management system 120. The AVs 110 and fleet management system 120 may connect over a public network, such as the Internet. The fleet management system 120 is described further in relation to FIG. 2.

The user device 130 is a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, are managed by the fleet management system 120, which may also provide the application to the user device 130. In other embodiments, the service is managed by a separate system (e.g., a food delivery service) that relies on the AV fleet for some or all of its transportation tasks and interacts with the fleet management system 120 to arrange transportation tasks. An application provided by the fleet management system 120 may provide various user interfaces to the user 135. In particular, the application may display coverage maps determined by the coverage system of the fleet management system 120, described below. In other examples, the coverage maps and/or other coverage information may be provided from the fleet management system 120 to a second service provider, which may provide coverage maps and/or coverage information to the user devices 130 through a separate application.

Example Fleet Management System

Figure 2:
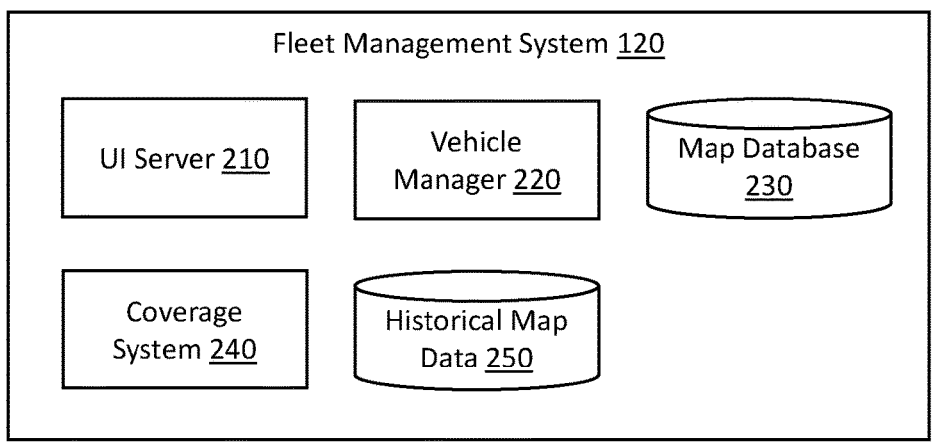
FIG. 2 is a block diagram illustrating a fleet management system according to some embodiments of the present disclosure.

FIG. 2 is a block diagram illustrating the fleet management system 120 according to some embodiments of the present disclosure. The fleet management system 120 includes a UI (user interface) server 210, a vehicle manager 220, a map database 230, a coverage system 240, and historical map data 250. In alternative configurations, different and/or additional components may be included in the fleet management system 120. Further, functionality attributed to one component of the fleet management system 120 may be accomplished by a different component included in the fleet management system 120 or a different system than those illustrated.

The UI server 210 is configured to communicate with client devices, such as user device 130, that provide a user interface to users. For example, the UI server 210 may be a web server that provides a browser-based application to client devices, or the UI server 210 may be a mobile app server that interfaces with a mobile app installed on client devices. The user interface enables the user to access a service of the fleet management system 120, e.g., to request a ride from an AV 110, or to request a delivery from an AV 110. The user interface may also provide coverage and reachability information to users, such as coverage maps indicating locations that the AV 110 can reach. Example map displays are shown in FIGS. 5-10 and described further below.

The vehicle manager 220 manages and communicates with a fleet of AVs, including AVs 110a through 110N. The UI server 210 transmits service requests received from users to the vehicle manager 220, and the vehicle manager 220 assigns AVs 110 to the service requests. More broadly, the vehicle manager 220 directs the movements of the AVs 110 in the fleet. For example, the vehicle manager 220 may instruct AVs 110 to drive to other locations while not servicing a user, e.g., to improve geographic distribution of the fleet, to anticipate demand at particular locations, to drive to a charging station for charging, etc. The vehicle manager 220 also instructs AVs 110 to return to AV facilities for recharging, maintenance, or storage. The vehicle manager 220 may interface with a navigation system, which selects a route for an AV 110 to follow, and may select locations for the AV 110 to stop. The navigation system may be a component of the vehicle manager 220, a separate component of the fleet management system 120, or a component of the onboard computer 150. Alternatively, navigation functions may be distributed across multiple systems, including the AV 110 and the fleet management system 120.

As an example, the UI server 210 receives a service request from a user, such as a request for a ride, and the UI server 210 passes this request to the vehicle manager 220. The vehicle manager 220 selects an AV 110 of the fleet to carry out the service request. The vehicle manager 220 identifies the origin location (e.g., starting point of the AV 110), destination location (e.g., drop-off location), and any waypoints (e.g., location to pick up the user). The navigation system determines a route for the AV 110 using map data in the map database 230, as described below, and provides the route to the AV 110. The vehicle manager 220 may receive updates about the location of the AV 110. The navigation system may periodically recalculate a route for the AV 110, e.g., based on changing traffic conditions.

The map database 230 stores data describing a set of connected roads. The map database 230 includes data describing each road, such as data describing geographic location of the road, connections to other roads, speed data (e.g., speed limit), and traffic flow direction. Many roads have multiple lanes, including one or more travel lanes along which vehicles can drive, parking lanes, bike lanes, bus lanes, pedestrian lanes, etc. A lane may comprise a portion of a road physically marked (e.g., by painting, a median, reflective markers, etc.), or a portion of a road on which vehicles travel or park by convention (e.g., the two sides of an unpainted two-way street may be considered two travel lanes running in opposite directions).

The map database 230 may include lane-level data describing individual lanes. The map data may be arranged as a routable lane graph in which each lane includes a start point, an end point, and connections to one or more other lanes in the road network. The routable lane graph may further include maneuver rules indicating how AVs 110 may travel along and between lanes. A lane may extend through an intersection, or a portion of a roadway through an intersection may be considered a distinct lane from a corresponding portion before the intersection. In some examples, multiple lanes overlap, such as lanes for different maneuvers through intersections.

The map database 230 may include additional lane-level parameters describing lanes in the routable graph. Additional parameters may include the position of a given lane relative to other lanes, e.g., whether the lane is a single-lane road, or the position of the lane relative to other lanes of a multi-lane road. The lane-level parameters may include attributes describing the environment of a given lane, such as attributes describing any visual obstructions associated with the lane (e.g., trees, statues, buildings, or fences that obstruct the view of oncoming traffic) or physical obstructions (e.g., downed trees, construction, large potholes). Additional lane-level parameters may include measurements of geometric features of the lane, such as width of a lane at various points or along a span (e.g., average and/or minimum width for the lane along each city block), curvature (e.g., maximum or average curvature around a turn), or grade (e.g., maximum and/or average grade of the lane along a city block).

The map database 230 includes data describing traveling lanes and stopping lanes. As used herein, a traveling lane is a portion of a road network along which an AV 110 can travel. A stopping lane is a portion of a road network along which an AV 110 can stop or park. A stopping lane can include a portion of a roadway dedicated to parking (e.g., a parking lane), a portion of a road that allows temporary stopping (e.g., a loading zone, a designated drop-off or pickup zone), a parking spot, or another surface connected to the road network in which an AV 110 can stop for a period of time to enable user interaction with the AV 110. In some embodiments, a traveling lane is also considered a stopping lane, e.g., if an AV 110 may double park on the traveling lane, or if the traveling lane is wide enough that other traffic may continue to pass the AV 110 if the AV 110 stops or parks along the side of the traveling lane. A particular lane may or may not be a stopping lane at different times of day (e.g., a valet zone may be a stopping lane during off-hours), for different users (e.g., a handicap parking spot may be used as a stopping lane for disabled passengers), based on traffic patterns (e.g., the AV 110 may stop in a traveling lane when there is little other traffic along the roads), or based on other factors.

In some embodiments, individual lanes may have both stopping portions and non-stopping portions. For example, if a lane extends through a crosswalk, the portion of the lane in the crosswalk may not be suitable for stopping, while an AV 110 may stop in other portions of the lane outside of the crosswalk. As another example, if a lane passes a fire hydrant, an AV 110 may not be permitted to stop along a portion of the lane near the fire hydrant (e.g., 5 meters on either side of the fire hydrant), while the AV 110 is permitted to stop on other portions of the lane. In some embodiments, a lane may be considered a stopping lane if an AV 110 can stop along some portion of a lane, or if an AV 110 can stop along at least a threshold percentage or length of the lane (e.g., at least 10 consecutive meters, or at least 25% of the lane length). In some embodiments, the map database 230 may store stopping portions and non-stopping portions as separate lanes, or the map database 230 or other systems may segment a lane into stopping sub-lanes and non-stopping sub-lanes. For example, the coverage system 240 may treat each stopping portion as a separate stopping lane.

In some embodiments, the map database 230 includes, for each lane, a data field indicating whether the lane is a stopping lane. The lane data may further include one or more fields indicating conditions under which a lane is a stopping lane, e.g., conditions describing time of day, type of user, or traffic patterns, as described above. In other embodiments, the lane data does not directly indicate whether each lane is a stopping lane, but includes other data fields, such as lane type (traveling, parking lane, bike lane, parking lane, etc.), lane position (e.g., right-most lane on a road, immediately to the right of a parking lane, single lane), and lane width. The coverage system 240 determines whether a given lane can be used as a stopping lane based on the lane-level map data.

The map database 230 is frequently updated based on real-world changes to the road network that affect the routability of lanes and whether AVs 110 can stop in stopping lanes. Routability refers to the ability of an AV 110 to travel on a particular lane. Some lane changes occur in a regular pattern, such as a lane that travels in one direction during a morning rush hour and travels in another direction during an afternoon rush hour, long-term nighttime construction hours on a particular road, and parking/stopping restrictions that apply during portions of the day. Some lane changes may be predictable, such as planned road closures for parades or events. Other lane changes occur without warning, such as when new road construction begins, or when a traffic accident or other type of unplanned incident occurs. The fleet management system 120 may receive information describing lane changes from various data sources, including from the fleet of AVs 110 traveling along the road network. The fleet management system 120 updates the routable lane graph to reflect current routability of lanes in the lane graph. Similarly, the fleet management system 120 updates the routable lane graph to reflect whether lanes in the routable lane graph are suitable for an AV 110 to stop.

The coverage system 240 determines service coverage areas for the fleet of AVs 110. As noted above, the service coverage area is a geographic area that is within a particular distance of the locations where AVs 110 can stop. The distance may be a straight-line distance, a walking distance (e.g., a distance along walkable roads or paths), a biking distance (e.g., a distance along bike-suitable roads or paths), a Manhattan or city block distance, or another type of distance. The coverage system 240 determines a service coverage area based on data in the map database 230 describing lanes along which the AVs 110 can stop, also referred to as stopping lanes. The coverage system 240 may determine multiple service coverage areas, e.g., based on different distances from the locations where the AVs 110 can stop. Furthermore, the coverage system 240 may frequently update the coverage areas based on changing lane data in the map database 230. Thus, the coverage system 240 can provide current coverage information that reflects real-time or near real-time road conditions. The process performed by the coverage system 240 to generate coverage areas is described further in relation to FIGS. 3 and 4.

The historical map data 250 stores data describing the set of connected roads at previous times or time periods. The historical map data 250 may include lane-level data, similar to the lane-level data included in the map database 230. The historical map data 250 may include a subset or summary of the data included in the map database 230. In some embodiments, the historical map data 250 includes coverage information or coverage areas from prior points in time. In some embodiments, the historical map data 250 includes data describing stopping lanes at historical points in time. The historical map data 250 may include snapshots describing the map or coverage at particular points in time, e.g., data captured on a daily or hourly basis, or snapshots captured each time the map database 230 changes.

Example Coverage System and Coverage Map Generation Process

Figure 3:
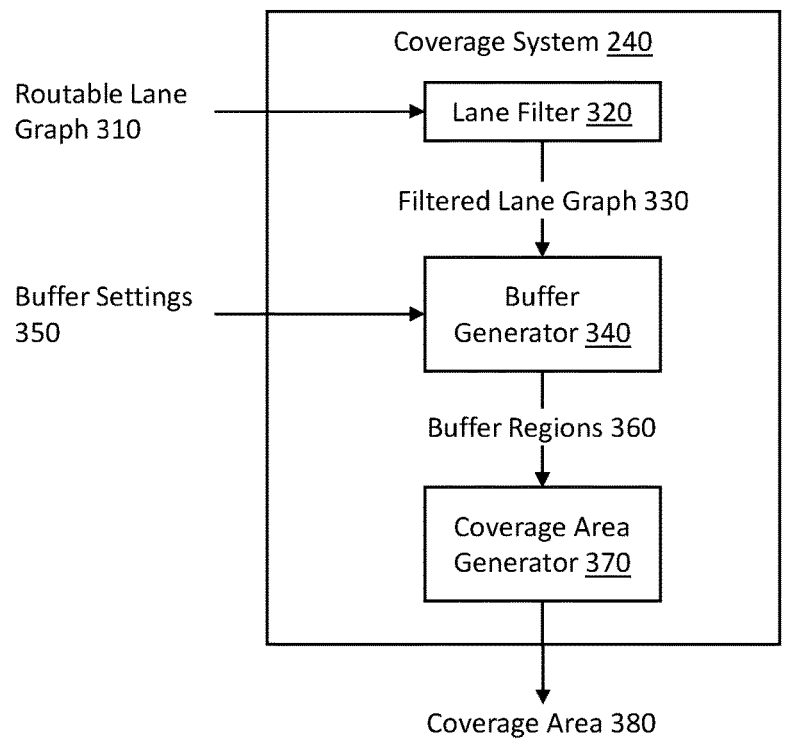
FIG. 3 is a diagram illustrating example components of a coverage system and data flow through the coverage system according to some embodiments of the present disclosure.

FIG. 3 is a diagram illustrating example components of the coverage system 240 and data flow through the coverage system 240 according to some embodiments of the present disclosure. The coverage system 240 includes a lane filter 320, a buffer generator 340, and a coverage area generator 370. In alternative configurations, different and/or additional components may be included in the coverage system 240. Further, functionality attributed to one component of the coverage system 240 may be accomplished by a different component included in the coverage system 240 or a different system than those illustrated.

The lane filter 320 accesses the map database 230 and filters the map data to identify a set of stopping lanes. As shown in FIG. 3, the lane filter 320 receives or accesses the routable lane graph 310 that describes the road network at the lane-level. The lane filter 320 filters the lanes in the routable lane graph 310 to select the stopping lanes. The set of stopping lanes is a subset of the set of connected lanes in the routable lane graph. If the routable lane graph 310 includes a field for each lane indicating whether or not the lane is or can be a stopping lane, the lane filter 320 filters the routable lane graph 310 using this field. Alternatively, if the routable lane graph 310 does not specifically indicate whether each lane is a stopping lane, the lane filter 320 may apply one or more rules to the routable lane graph 310 to identify lanes that are suitable for stopping. For example, the lane filter 320 selects lanes that are a parking lane or parking spot type. As noted above, certain stopping lanes may have particular usage rules or conditions, e.g., only allowing stopping during particular times of day, for particular type of user, under particular traffic conditions, etc. The lane filter 320 may implement any such usage rules or conditions to select the set of stopping lanes. Further, as described above, some lanes in the map database 230 may have stopping portions and non-stopping portions. The lane filter 320 may select the stopping portions to include in the set of stopping lanes. The lane filter 320 may retrieve data from other data sources, e.g., data describing the user 135, data describing current traffic conditions, etc., to perform the filtering.

The lane filter 320 outputs the filtered lane graph 330 to the buffer generator 340. For each lane in the filtered lane graph 330, the buffer generator 340 generates a buffer region that includes an area around the lane. In some embodiments, the buffer generator 340 generates the buffer regions according to one or more buffer settings 350. For example, the buffer settings 350 may indicate a particular distance from the lanes for the buffer generator 340 to include in the buffer regions. The distance may be a straight-line distance, a walking distance, or another type of distance, as described further below. Each lane in the filtered lane graph 330 includes geometric information describing the lane. The buffer generator 340 extends the area of the lane to include all points that are within the particular distance indicated by the buffer settings 350 from any point in the lane. The buffer generator 340 may create multiple buffers regions for a lane, each buffer region corresponding to a different distance as indicated by different buffer settings 350. For example, the buffer generator 340 may generate sets of buffer regions at 5 meter intervals (e.g., a 5 meter buffer, a 10 meter buffer, etc. up to a certain maximum distance). As the distance from the lane increases, the size of the buffer region increases.

Figure 4:
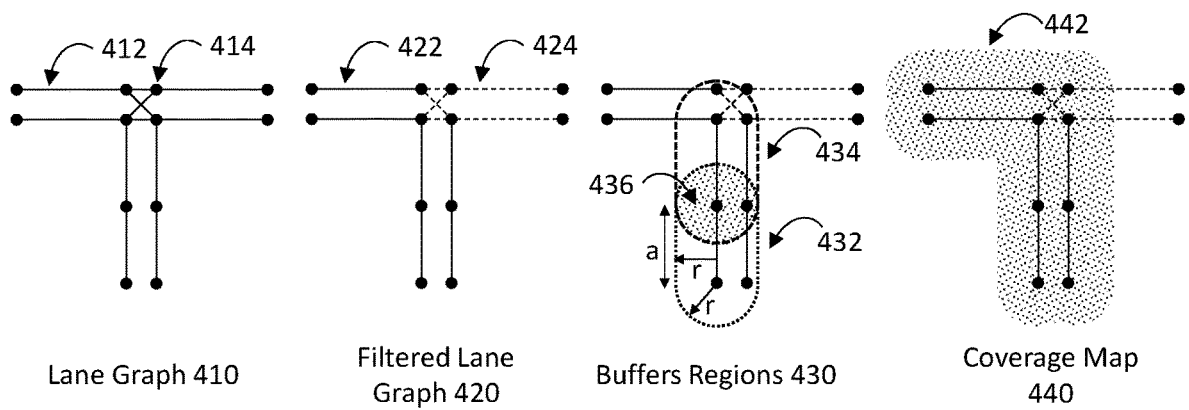
FIG. 4 is an illustration of generating a coverage map for an example set of lanes according to some embodiments of the present disclosure.

As an example, if the lane is represented as a straight line from the start point to the end point, the buffer generator 340 generates a stadium-shaped buffer region centered around the straight line lane representation. An example of a stadium-shaped buffer region is shown in FIG. 4. If the lane has another shape, e.g., the lane is represented as a curved line, the buffer generator 340 generates a different buffer shape based on the shape of the lane. In some embodiments, the lane is represented as a two-dimensional shape (e.g., a rectangle), and the buffer generator 340 generates a buffer region that extends outward from the boundaries of the lane. For a rectangular lane, the buffer region is a rounded rectangle.

In some embodiments, the map database 230 includes multiple levels of detail describing the lane geometry. For example, the map database 230 may include detailed lane geometry information describing the boundaries and shape of each lane in two or three dimensions. The coverage system 240 may use a simplified geometry describing the lane geometry to generate the buffer region. For example, the buffer generator 340 accesses a start point and an end point for each lane, and the lane geometry is approximated as a straight line between the start point and the end point.

In some embodiments, the buffer generator 340 generates a shape for a buffer region that accounts for real-world constraints on a user's movement outside the vehicle. For example, if a particular lane is along one side of a road having a median, and a pedestrian cannot cross from the lane to the side of the street opposite the median, the buffer generator 340 generates a buffer region that does not include the side of the street opposite of the median and areas extending out from that side of the street. In some embodiments, the buffer generator 340 obtains crosswalk information and includes areas that can be accessed by crosswalk in the buffer region, but does not include areas that cannot be accessed by crosswalk in the buffer region.

More generally, the buffer generator 340 may consider possible routes (e.g., walking routes, biking routes, transit routes, or routes with a combination of transit modes) in generating the boundaries of the buffer region, so that the buffer region corresponds to an area that, for example, a pedestrian can reach within a set walking distance, or a bicyclist can reach within a set biking distance. For example, to generate buffers for walking distances, the buffer generator 340 or a separate walking-distance polygon generator may generate a polygon boundary indicating an area that is reachable from a point within a particular walking distance, following walkable paths (e.g., routes composed of sidewalks, crosswalks, walking paths, etc.). The buffer generator 340 may generate or obtain walking-distance polygons for a lane, and use the walking-distance polygon as the buffer region. Alternatively, the buffer generator 340 may generate or obtain a walking-distance polygon for various points along a lane and combine the polygons into the buffer region for the lane.

In some embodiments, the buffer generator 340 converts a transport time (e.g., walking time or biking time) into a distance and generates or retrieves the boundary of the buffer region based on the determined distance. Generally, any distance can be measured in terms of estimated time, and so some embodiments can use a travel time via a single or multiple transit modes as a distance measure. In some embodiments, the buffer generator 340 identifies buildings or other features that can be reached within the specified distance and includes the footprint of the building or feature within the buffer region. In some embodiments, the buffer generator 340 or walking-distance polygon generator considers accessibility for one or more alternate forms of transportation outside of the AV 110 in determining the buffer region. For example, the buffer generator 340 may generate a buffer region corresponding to an area that a wheelchair can reach within a particular distance from the lane (e.g., including street crossings that are accessible by curb cuts, and removing routes that involve stairs). Various access considerations and rules for generating the buffer regions may be included in the buffer settings 350.

The buffer generator 340 outputs the buffer regions 360 to a coverage area generator 370. The coverage area generator 370 combines the buffer regions 360 into a single coverage area 380. Because the lanes are connected, and the areas of the buffer regions are larger than the areas of the lanes themselves, some buffer regions 360 overlap. The coverage area generator 370 de-duplicates the overlapping areas to generate the coverage area 380. An example is shown in FIG. 4.

In some embodiments, the coverage system 240 calculates a coverage ratio or coverage percentage based on the coverage area 380. The coverage system 240 divides the size of the coverage area 380 by the size of a maximum coverage area, e.g., an area that a theoretical AV or automobile could reach. To determine the maximum coverage area for a given city or region, the coverage system 240 may calculate a coverage area for all roadways in the city. For example, the buffer generator 340 receives the routable lane graph 310 and calculates buffer regions for all lanes in the routable lane graph 310 using the same distance and buffer settings 350 used to generate the buffer regions 360. In some embodiments, rather than calculating the buffer regions for all lanes in the routable lane graph, the lane filter 320 may exclude a portion of roadways in the routable lane graph that could not be used as stopping lanes for any AVs or automobiles, such as highways. The coverage area generator 370 generates the maximum coverage area from the buffer regions. The coverage area for a particular city or region is divided by the maximum coverage area for the corresponding city or region to obtain a coverage ratio. The coverage ratio indicates how fully the fleet of AVs 110 can cover the city or region. The coverage system 240 may generate different coverage ratios for different conditions, such as different distances, different distance settings (e.g., straight-line or walking distance), different times of day or days of the week, etc.

Illustration of Generating a Coverage Area

FIG. 4 is an illustration of the process for generating a coverage map for an example set of lanes according to some embodiments of the present disclosure. A portion of a routable lane graph is represented as the lane graph 410. Lane graph 410 shows two two-lane roads crossing at a T-intersection. Each lane is represented as a line, e.g., line 412, and connections between lanes are represented as a node, e.g., node 414. Each lane represents a possible path that an AV 110 can take along the roads and through the T-intersection.

The filtered lane graph 420 is an example portion of the filtered lane graph 330. The lane filter 320 selects a portion of the lanes in the lane graph 410 that are stopping lanes to generate the filtered lane graph 420, as described with respect to FIG. 3. In this illustration, the lane filter 320 has selected the lanes represented as solid lines, such as lane 422. The lane filter 320 does not select the lanes that are represented as dashed lines, such as lane 424. The selected lanes are suitable for the AV 110 to stop, e.g., the selected lanes may be sufficiently wide for the AV 110 to pull over and allow other vehicles to pass. By contrast, the unselected lanes are not suitable for the AV 110 to stop. The unselected lanes include the lanes that cross through the intersection, because the AV 110 cannot stop in the middle of the intersection.

The buffer generator 340 receives the filtered lane graph 420 and generates buffer regions 430 around the lanes in the filtered lane graph 420. Two example buffer regions 432 and 434 are illustrated in FIG. 4. FIG. 4 illustrates outlines of the buffer regions 432 and 434 using two different styles of dashed lines to distinguish the two buffer regions 432 and 434. The buffer regions 434 and 432 have an overlapping portion 436, which is shaded in FIG. 4.

In this illustration, each of the lanes is represented as a straight line connecting a start point and an end point, represented as the nodes. Each buffer region has a stadium shape having a radius equal to the distance indicated in the buffer settings 350, e.g., a set walking distance from the lane. An example radius r for buffer region 432 is shown in FIG. 4. The stadium shape further has a straight side length that is equal to the distance between the start point and the end point. An example straight side length a for the buffer region 432 is shown in FIG. 4.

The buffer generator 340 generates buffer regions in a similar manner for the other lanes in the filtered lane graph 420. As noted with respect to FIG. 3, in other embodiments, the buffer generator 340 may generate buffers of alternate shapes, e.g., based on real-world constraints on walking or otherwise traveling in the area surrounding the lane.

The coverage area generator 370 combines the buffer regions, including buffer regions 432 and 434 and buffer regions generated for the other filtered lanes, to generate a coverage area. The coverage area is represented graphically on the coverage map 440. The example coverage map 440 shows the coverage area generated from the buffer regions 430 of the filtered lane graph 420; the coverage area is represented by the shaded region 442 overlaying the lane graph. A coverage area may alternatively be represented as a single boundary describing the outer bounds of the combined buffer regions, e.g., the boundary surrounding the shaded region 442. In some example, the coverage area generator 370 may generate multiple boundaries for non-contiguous areas. If the AV fleet 110 does not include any AVs 110 operating within a given area that is not connected to another area with an AV 110, the coverage area generator 370 may remove the non-contiguous area without any AVs 110 from the coverage area and/or from a coverage map generated based on the coverage area.

Example Coverage Map Displays

The UI server 210 may display the coverage area generated by the coverage system 240 to users in various formats. For example, the UI server 210 provides data describing the coverage area to the user device 130, which displays the coverage area overlaying a map. Example coverage maps that may be generated by the user device 130 based on a coverage area are shown in FIGS. 5-10. The user device 130 may display a portion of a coverage area and underlying map (referred to as a coverage map), and allow the user to pan and zoom to display different portions of the coverage map. In some embodiments, the user device 130 or UI server 210 may compare particular locations to the coverage area, determine if a particular location falls within the coverage area, and provide a display to the user indicating whether the location is within the coverage area. For example, the user device 130 may access a current device location, compare the current device location to the coverage area, and notify the user whether or not the current device location falls within the coverage area. As another example, the user may input an address, and the user device 130 compares the address to the coverage area, and notifies the user whether or not the address falls within the coverage area. If a particular location is outside the coverage area, the user device 130 may output an indication of how far the location is from the coverage area.

Figure 5:
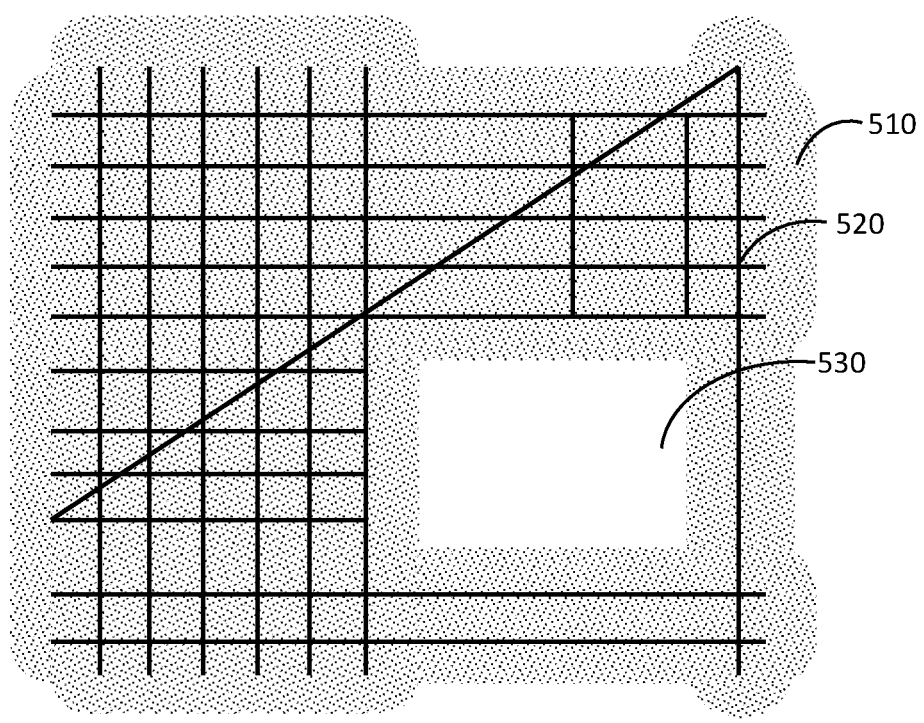
FIG. 5 is an example coverage map generated by the coverage system.

FIG. 5 is an example coverage map generated by the coverage system 240. The coverage map includes a graphical depiction of a coverage area 510 generated by the coverage system 240 overlayed on a map of roads 520. The roads 520 corresponds to the set of connected roads from which the coverage system 240 generated the coverage area 510. In this example, the coverage area 510 generally covers the roads 520 and regions between the roads. For example, the distance used to generate the buffer regions is 100 meters, and the roads depicted as horizontal lines in FIG. 5, which are roughly an even width apart, are set on average 100 meters apart. If the AVs 110 can stop or pull over along at least one lane of the roads 520, or most of the roads 520, the coverage system 240 generates the coverage area 510 shown in FIG. 5. While the coverage area 510 covers the general area around the roads 520, the coverage area 510 does not include an area 530 through which roads do not pass. The area 530 may represent a park or a large building, such as a hospital or arena.

Figure 6:
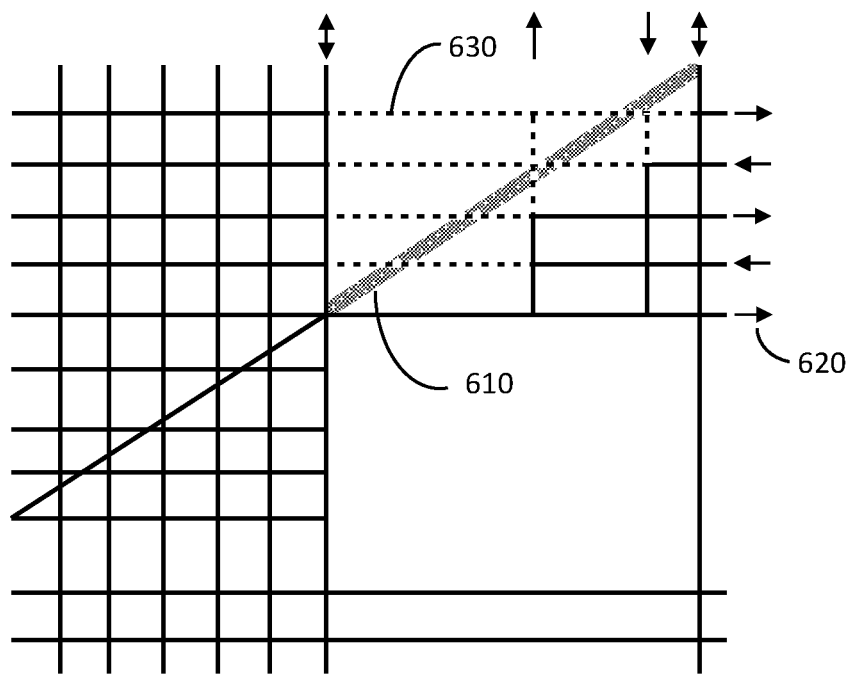
FIG. 6 is an example map illustrating lanes that are removed from the routable lane graph.

FIG. 6 is an example map illustrating lanes that are removed from the routable lane graph. In this example, a portion of the road 610 that diagonally traverses the upper-right portion of the map is closed to through-traffic and cross-traffic, as indicated by the darker shading along this portion of the road 610. For example, this portion of the road 610 may have a parade, or is undergoing construction, or is closed for some other reason. In response to receiving data that the portion of road 610 is closed, the fleet management system 120 updates the map database 230 to reflect this closure. In particular, the fleet management system 120 removes lanes along the closed portion of road 610 from the routable lanes in the map database 230, or marks these lanes as unrouteable. In some cases, the fleet management system 120 may change or remove additional lanes from the map database 230 if routability of the additional lanes are affected by the closure of another road or lane. In the example shown in FIG. 6, some of the roads that cross this portion of the road 610 are one-way roads; the direction or directions of travel for each of the roads in the upper-right portion of the map is indicated by arrows in line with the road, such as arrow 620. Closing the portion of the road 610 to through- and cross-traffic affects the routability of a number of lanes that intersect the road 610. The roads that are no longer routable are marked with a dashed line, such as the road 630. The fleet management system 120 further updates the map database 230 to indicate that the lanes along the dashed roads are not routable.

Figure 7:
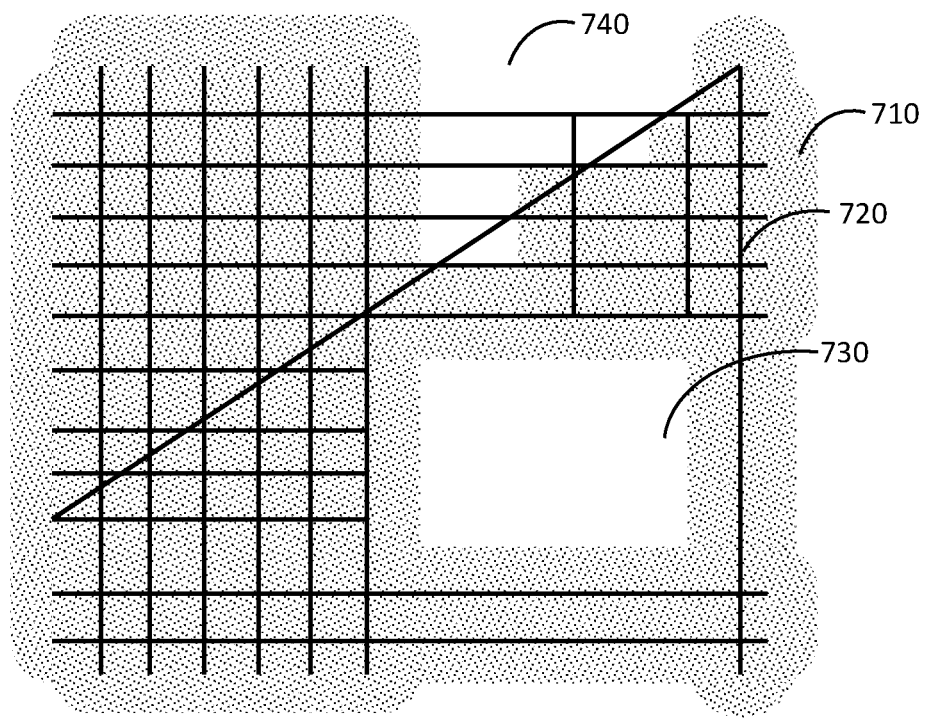
FIG. 7 is an example coverage map that accounts for the removed lanes in FIG. 6.

The coverage system 240 generates a revised coverage area that reflects the change to the map database 230 illustrated in FIG. 6. FIG. 7 is an example coverage map that accounts for the removed lanes in FIG. 6. The coverage map shown in FIG. 7 includes a graphical depiction of a coverage area 710 generated by the coverage system 240 and overlayed on a map of roads 720. The coverage area 710 is a revised coverage area relative to the coverage area 510. In this example, the roads 720 are the same as the roads 520, and the closed and unrouteable lanes shown in FIG. 6 are displayed in the coverage map. The coverage area 710 does not include an uncovered area 730 through which roads do not pass; this uncovered area 730 corresponds to the area 530 in FIG. 5. In addition, the coverage area 710 does not include a second uncovered area 740 around the diagonal closed portion of road 610 and areas near some the additional unrouteable lanes shown in FIG. 6. The changes in routability in the upper-right portion of the map results in portions of the map becoming unreachable to the AVs 110, as indicated by the uncovered area 740. In some embodiments, a user interface provided to a user includes information explaining the change in coverage, e.g., a symbol or explanation on or near the closed portion of road 610 indicating that the road is closed and is affecting coverage in the area.

In some embodiments, the user interface allows the user to select different distances from the stoppable lanes, and displays different coverage maps reflecting the different distances. For example, the user interface includes a slider bar that the user can move to select a distance, or the user can enter in a specific distance. This allows a user to obtain a coverage map that reflects how far the user is willing to walk (or bike, etc.) to or from the AV 110. The coverage system 240 may generate coverage areas corresponding to different distances, as described above. In response to receiving a user selection of a particular distance, the user interface accesses the coverage area corresponding to the selected distance and provides a display of the coverage area for the selected distance. For example, the UI server 210 receives a user selection of a distance entered by the user on the user device 130, and the UI server 210 retrieves the corresponding coverage area from a memory and transmits the coverage area to the user device 130 for display.

Figure 8:
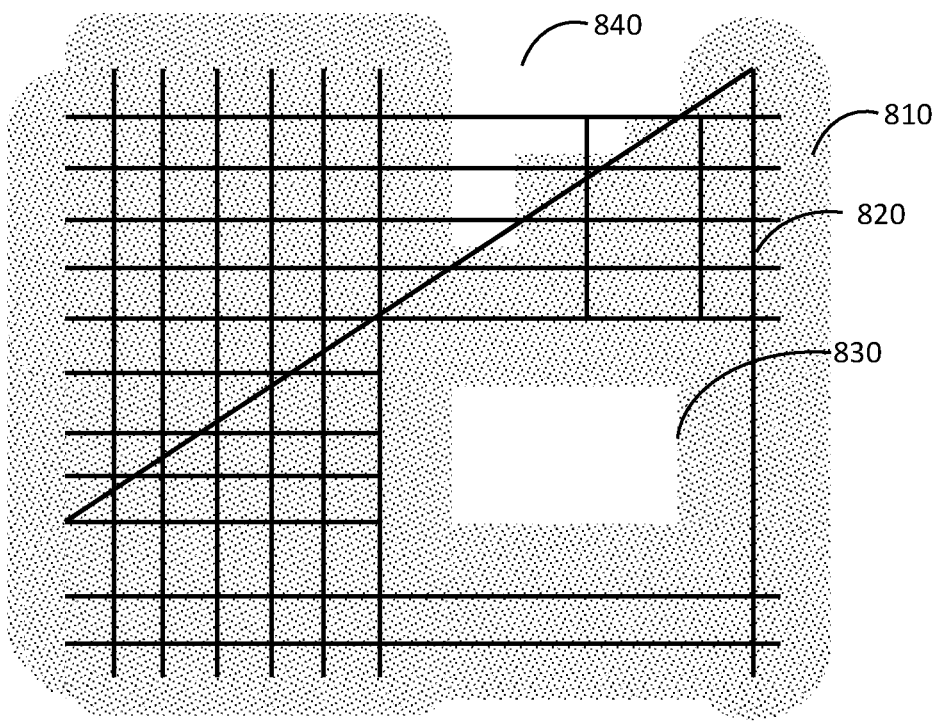
FIG. 8 is an example coverage map that has a greater walking distance than the example map in FIG. 7.

FIG. 8 is an example coverage map that has a greater set walking distance than the example map in FIG. 7. For example, if the coverage area 710 is based on a walking distance of 100 meters, the coverage area 810 in FIG. 8 is based on a walking distance of 150 meters. The coverage area 810 is a larger coverage area relative to the coverage area 810. In this example, the roads 820 are the same as the roads 520 and 720. The coverage area 810 does not include an uncovered area 830 through which roads do not pass; this uncovered area 830 corresponds to the area 730 in FIG. 7, but the uncovered area 830 is smaller, as the user is willing to walk farther from the roads 820. In addition, the second uncovered area 840 around the diagonal closed portion of road 610 and areas near some the additional unrouteable lanes is smaller than the uncovered area 740 shown in FIG. 7.

While the coverage areas shown in FIGS. 5-8 are shown as shaded regions, the coverage areas may alternatively be drawn as boundaries. The boundaries may be overlayed on maps with other information, such as a heat map showing locations for which requests for service have been received. The UI server 210 may store locations of requests for an AV 110 (e.g., the pickup or drop-off locations from a rideshare request), and the heatmap distinguishes popular regions with a lot of pickup and drop-off activity from unpopular regions with little or no pickup and drop-off activity. The UI server 210 may store only a portion of the service request locations, e.g., only for users that have opted-in to data collection. Furthermore, the UI server 210 may store the service request locations separately from any identifying information to protect user privacy. Drawing coverage area boundaries over a heat map of AV requests indicates how well the AV fleet can service the needs of the users. In other examples, the coverage area or coverage area boundaries may be overlayed on maps with other types of information, such as population maps, maps of a public transit system, maps showing bicycle routes, etc.

Figure 9:
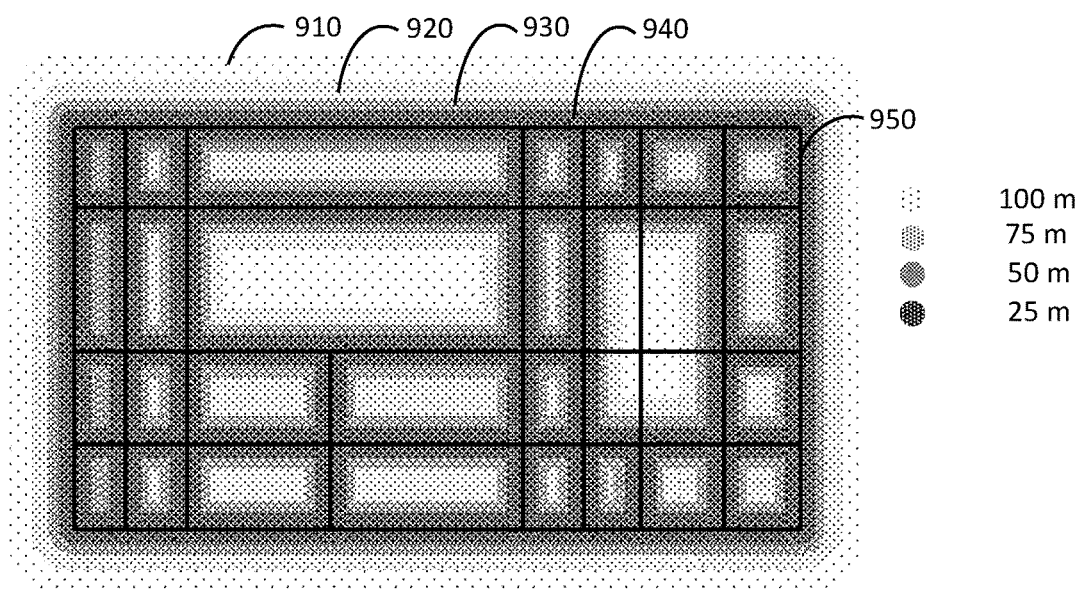
FIG. 9 is an example coverage map that displays coverage for multiple walking distances.

FIG. 9 is an example coverage map that displays coverage for multiple walking distances. In this example, the coverage system 240 generates multiple coverage areas based on different distances from the lanes. In particular, the buffer generator 340 generates a first set of buffer regions with a 100 meter buffer, a second set of buffer regions with a 75 meter buffer, a third set of buffer regions with a 50 meter buffer, and a fourth set of buffer regions with a 25 meter buffer. In other embodiments, the buffer generator 340 generates different buffer sizes, or more or fewer sets of buffer regions. The coverage area generator 370 generates a coverage area based on each of the sets of buffer regions, e.g., a 100 meter coverage area, a 75 meter coverage area, a 50 meter coverage area, and a 25 meter coverage area. The UI server 210 or the user device 130 combines the different coverage areas to generate the coverage map shown in FIG. 9. The coverage map includes the 100 meter coverage area 910, the 75 meter coverage area 920, the 50 meter coverage area 930, and the 25 meter coverage area 940. The coverage areas 910-940 are overlayed, with the smaller coverage areas overlaying the larger coverage areas (e.g., the 25 meter coverage area 940 overlays a portion of each of the larger coverage areas 910-930), and the road 950 overlayed on the coverage areas. In other embodiments, rather than showing several distinct coverage areas such as the four coverage areas 910-940 shown in FIG. 9, the user interface displays a smooth graduated coverage area, e.g., an area that changes in color from a dark shade to a lighter shade expanding outward from the stopping lanes.

Figure 10:
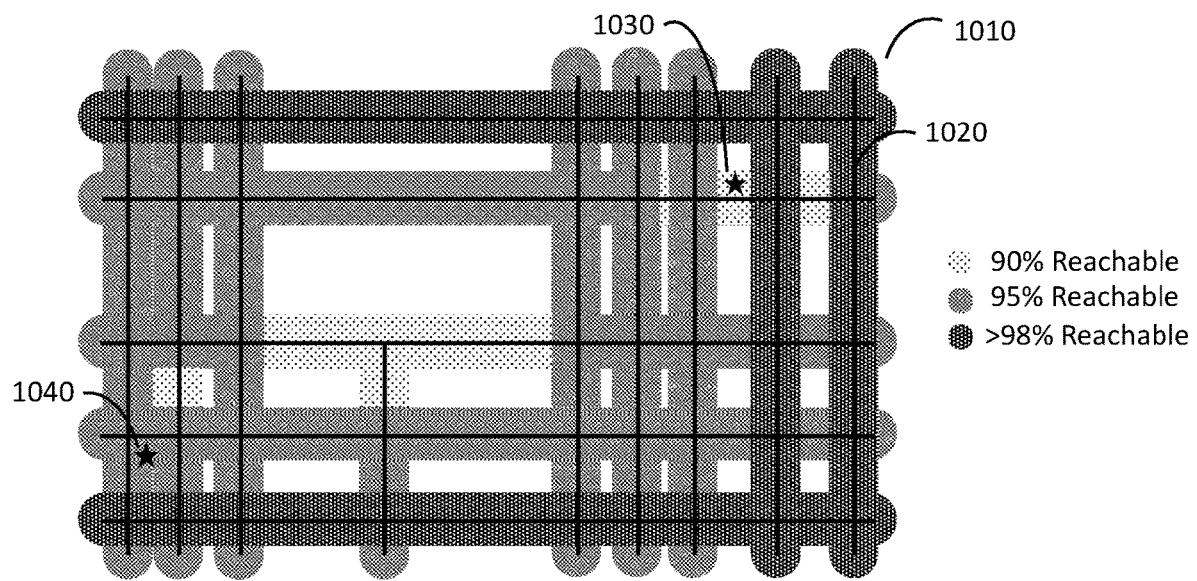
FIG. 10 is an example coverage map that indicates how often different regions within the map are reachable.

FIG. 10 is an example coverage map that indicates how often different regions within the map are reachable. In this example, the coverage system 240 generates a coverage area based on historical map data 250. As described with respect to FIG. 2, the historical map data 250 describes coverage areas at earlier times. For example, the coverage system 240 may store one or more coverage areas (e.g., multiple coverage areas corresponding to different distances from the stopping lanes) based on existing map data in the map database 230 on an hourly basis. The historical map data 250 may maintain this historical data for a certain period of time, e.g., the hourly coverage areas from the past 30 days, or from the past year. In other embodiments, the historical map data 250 includes data from which the historical coverage areas may be derived.

The coverage system 240 generates the graduated coverage area 1010 shown in FIG. 10 based on the historical map data 250. At different portions of the coverage area, the coverage system 240 calculates frequencies that the portions are reachable, e.g., the percentage of the previous times that each portion of the coverage area is reachable. For example, the coverage system 240 may break the map area into a one-meter or five-meter grid, and at each point along the grid, determine at each point in time for which historical map data 250 is available whether or not the point can be reached. The coverage system 240 may combine the historical data at each point to determine a percentage of the previous times that each point is reachable, and combine these percentages to generate a coverage gradient. This coverage gradient can be visually represented as the graduated coverage area 1010 shown in FIG. 10, where different portions of the coverage area 1010 have different shading or coloring representing how often the portions are reachable. The user interface can provide at least a portion of the graduated coverage area overlayed on a map of roads 1020, which corresponds to the roads in the current map database 230. In some embodiments, the graduated coverage area may be based on a subset of the historical map data 250, e.g., the coverage system 240 may generate different graduated coverage maps for different times of day, for weekdays or weekends, etc.

In this example, the map also includes points of interest 1030 and 1040. The points of interest 1030 and 1040 may correspond to addresses, buildings, or other geographic points selected by a user in the user interface of the user device 130. For example, the point of interest 1030 may represent a user's home, and the point of interest 1040 may represent the user's workplace. By displaying the graduated coverage area 1010 over the map of roads 1020 and the user's points of interests 1030 and 1040, the user can easily determine how often the AV service can reach these points of interest. For example, the user may determine that while the user's home 1030 is frequently not reachable (10% of the time), one of the cross-streets typically is reachable (>98% of the time), which increases the usefulness of the AV service if the user is willing to walk to the cross-street. Points of interests may be similarly displayed on other coverage maps, such as the maps shown in FIGS. 5 and 7-9.

SELECT EXAMPLES

Example 1 provides a method for determining and displaying a coverage area, and a computer-readable medium for performing the method. The method includes selecting, from a map database storing data describing a set of connected roads each having one or more lanes, a plurality of lanes along which an AV can stop; generating a plurality of buffer regions, each buffer region corresponding to a respective lane of the plurality of lanes and including an area within a particular distance from the lane; combining the plurality of buffer regions to generate a coverage area; and providing a display of at least a portion of the coverage area overlayed on a map of roads corresponding to at least a portion of the set of connected roads in the map database.

Example 2 provides the method according to example 1, where selecting the plurality of lanes along which an AV can stop includes retrieving, from the map database, a routable graph including a plurality of connected lanes along which an AV can be routed; and filtering the routable graph to obtain the plurality of lanes along with the AV can stop, where the plurality of lanes is a subset of the plurality of connected lanes.

Example 3 provides the method of claim 2, where one of the connected lanes includes a first portion along which the AV can stop and a second portion along which the AV cannot stop, and selecting the plurality of lanes along which the AV can stop includes selecting the first portion along which the AV can stop as one of the plurality of lanes along which the AV can stop.

Example 4 provides the method according to example 2 or 3, further including receiving, from an AV, data describing routability of a lane represented in the routable graph; and updating the routable graph based on the data from the AV.

Example 5 provides the method according to any of examples 2 through 4, further including receiving, from an AV, data describing whether a lane represented in the routable graph is suitable for an AV to stop; and updating the routable graph based on the data from the AV.

Example 6 provides the method according to any of the preceding examples, where one of the plurality of lanes includes a start point and an end point, and generating the buffer region for the lane includes generating a stadium-shaped region having a radius equal to the particular distance and a straight side length equal to a distance between the start point and the end point.

Example 7 provides the method according to any of the preceding examples, where the particular distance is a walking distance, and each buffer region comprises an area reachable by a person walking from points along the lane.

Example 8 provides the method according to any of the preceding examples, where the particular distance is a first distance and the coverage area is a first coverage area, and the method further includes generating a second plurality of buffer regions, each of the second plurality of buffer regions corresponding to a respective lane of the plurality of lanes and including an area within a second distance from the lane, the second distance less than the first distance; and combining the second plurality of buffer regions to generate a second coverage area.

Example 9 provides the method according to example 8, where the display further includes the second coverage area overlayed on the first coverage area, such that the second coverage area and a portion of the first coverage area are visible.

Example 10 provides the method according to any of the preceding examples, further including retrieving historical map data, the historical map data describing coverage areas on a plurality of previous times; generating, based on the historical map data, a graduated coverage area indicating a percentage of the previous times that each portion of the coverage area can be reached; and providing a display of at least a portion of the graduated coverage area overlayed on a map of roads corresponding to at least a portion of the set of connected roads in the map database.

Example 11 provides the method according to any of the preceding examples, further including receiving road closure data indicating that an AV cannot traverse at least one of the set of connected roads; removing at least one lane from the plurality of lanes along which an AV can stop based on the road closure data; generating a revised coverage area based on the plurality of lanes with the at least one lane removed; and providing a display of at least a portion of the revised coverage area.

Example 12 provides the method according to any of the preceding examples, further including receiving, by a user interface, a user selection of the particular distance; selecting, from a plurality of coverage areas each associated with a respective one of a plurality of different distances, the coverage area associated with the particular distance; and providing a display of the selected coverage area in the user interface.

Example 13 provides a system including a map database and computer circuitry. The map database stores data describing a graph of connected lanes and, for each of the lanes, data indicating whether an AV of an AV fleet is permitted to stop along the lane. The navigation system is configured to filter the data in the map database to select lanes along which an AV of the AV fleet is permitted to stop; for each of the selected lanes, generate a buffer region including an area within a particular distance from the selected lane; and combine the buffer regions to generate a coverage area for the AV fleet.

Example 14 provides the system according to example 13, further including a UI server to provide a display of at least a portion of the coverage area overlayed on a map of roads corresponding to at least a portion of the graph of connected lanes in the map database.

Example 15 provides the system according to example 13 or 14, the computer circuitry further configured to receive, from an AV, data describing routability of a lane represented in the graph of connected lanes; and update the map database based on the data from the AV.

Example 16 provides the system according to any of examples 13-15, where the computer circuitry is further configured to determine a maximum coverage area for the AV fleet, the maximum coverage area including areas within the particular distance from at least a portion of the graph of connected lanes, and divide a size of the coverage area by a size of the maximum coverage area to calculate a coverage ratio.

Example 17 provides the system according to any of examples 13-16, where the computer circuitry is further configured to retrieve historical map data, the historical map data describing coverage areas on a plurality of previous times, and generate, based on the historical map data, a graduated coverage area indicating a percentage of the previous times that each portion of the coverage area can be reached.

Example 18 provides the system according to any of examples 13-17, where the computer circuitry is further configured to receive road closure data indicating that an AV cannot traverse at least one of the graph of connected lanes; remove at least one lane from the selected lanes along which an AV can stop based on the road closure data; and generate a revised coverage area based on the selected lanes with the at least one lane removed.

Example 19 provides a computer-readable medium storing instructions for determining and displaying a coverage area. The instructions, when executed by a processor, cause the processor to select, from a map database storing data describing a set of connected roads each having one or more lanes, a plurality of lanes along which an AV can stop; generate a plurality of buffer regions, each buffer region corresponding to a respective lane of the plurality of lanes and including an area within a particular distance from the lane; combine the plurality of buffer regions to generate a coverage area; and provide a display of at least a portion of the coverage area overlayed on a map of roads corresponding to at least a portion of the set of connected roads in the map database.

Example 20 provides the computer-readable medium according to example 19, where selecting the plurality of lanes along which an AV can stop includes retrieving, from the map database, a routable graph including a plurality of connected lanes along which an AV can be routed; and filtering the routable graph to obtain the plurality of lanes along with the AV can stop, where the plurality of lanes is a subset of the plurality of connected lanes.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for determining and displaying a coverage area, the method comprising:
   selecting, from a map database storing data describing a set of connected roads each having one or more lanes, a plurality of lanes along which an AV can stop;
   generating a plurality of buffer regions, each buffer region corresponding to a respective lane of the plurality of lanes and comprising an area within a particular distance from the lane, each buffer region representing a respective area of a map, and each buffer region comprising the respective lane and a respective portion of the map outside of the respective lane;
   combining the plurality of buffer regions to generate a coverage area, the coverage area representing a combined area of the map, the coverage area including portions of the map outside the set of connected roads; and
   providing a display of at least a portion of the coverage area overlayed on the map, the map comprising roads corresponding to at least a portion of the set of connected roads in the map database.

2. The method of claim 1, wherein selecting the plurality of lanes along which an AV can stop comprises:
   retrieving, from the map database, a routable graph comprising a plurality of connected lanes along which an AV can be routed; and
   filtering the routable graph to obtain the plurality of lanes along with the AV can stop, wherein the plurality of lanes is a subset of the plurality of connected lanes.

3. The method of claim 2, wherein one of the connected lanes comprises a first portion along which the AV can stop and a second portion along which the AV cannot stop, and selecting the plurality of lanes along which the AV can stop comprises selecting the first portion along which the AV can stop as one of the plurality of lanes along which the AV can stop.

4. The method of claim 2, further comprising:
   receiving, from an AV, data describing routability of a lane represented in the routable graph; and
   updating the routable graph based on the data from the AV.

5. The method of claim 2, further comprising:
   receiving, from an AV, data describing whether a lane represented in the routable graph is suitable for an AV to stop; and
   updating the routable graph based on the data from the AV.

6. The method of claim 1, wherein one of the plurality of lanes comprises a start point and an end point, and generating the buffer region for the lane comprises generating a stadium-shaped region having a radius equal to the particular distance and a straight side length equal to a distance between the start point and the end point.

7. The method of claim 1, wherein the particular distance is a walking distance, and each buffer region comprises an area reachable by a person walking from a point along the lane.

8. The method of claim 1, wherein the particular distance is a first distance and the coverage area is a first coverage area, the method further comprising:
   generating a second plurality of buffer regions, each of the second plurality of buffer regions corresponding to a respective lane of the plurality of lanes and comprising an area within a second distance from the lane, the second distance less than the first distance; and
   combining the second plurality of buffer regions to generate a second coverage area.

9. The method of claim 8, wherein the display further comprises the second coverage area overlayed on the first coverage area, such that the second coverage area and a portion of the first coverage area are visible.

10. The method of claim 1, further comprising:
    retrieving historical map data, the historical map data describing coverage areas on a plurality of previous times;
    generating, based on the historical map data, a graduated coverage area indicating a percentage of the previous times that each portion of the coverage area can be reached; and
    providing a display of at least a portion of the graduated coverage area overlayed on the map.

11. The method of claim 1, further comprising:
    receiving road closure data indicating that an AV cannot traverse at least one of the set of connected roads;
    removing at least one lane from the plurality of lanes along which an AV can stop based on the road closure data;
    generating a revised coverage area based on the plurality of lanes with the at least one lane removed; and
    providing a display of at least a portion of the revised coverage area.

12. The method of claim 1, further comprising:
    receiving, by a user interface, a user selection of the particular distance;
    selecting, from a plurality of coverage areas each associated with a respective one of a plurality of different distances, the coverage area associated with the particular distance; and
    providing a display of the selected coverage area in the user interface.

13. A system for determining a coverage area, the system comprising:
    a map database storing data describing a graph of connected lanes and, for each of the lanes, data indicating whether an autonomous vehicle (AV) of an AV fleet is permitted to stop along the lane; and
    computer circuitry to:
       filter the data in the map database to select lanes along which an AV of the AV fleet is permitted to stop;
       for each of the selected lanes, generate a buffer region comprising an area within a particular distance from the selected lane, each buffer region representing a respective area of a map, and each buffer region comprising the respective lane and a respective portion of the map outside of the respective lane; and
       combine the buffer regions to generate a coverage area for the AV fleet, the coverage area representing a combined area of the map, the coverage area including portions of the map outside the connected lanes.

14. The system of claim 13, further comprising a user interface (UI) server to provide a display of at least a portion of the coverage area overlayed on the map, the map comprising roads corresponding to at least a portion of the graph of connected lanes in the map database.

15. The system of claim 13, the computer circuitry further configured to:
    receive, from an AV, data describing routability of a lane represented in the graph of connected lanes; and
    update the map database based on the data from the AV.

16. The system of claim 13, the computer circuitry further configured to:
   determine a maximum coverage area for the AV fleet, the maximum coverage area comprising areas within the particular distance from at least a portion of the graph of connected lanes; and
   divide a size of the coverage area by a size of the maximum coverage area to calculate a coverage ratio.

17. The system of claim 13, the computer circuitry further configured to:
   retrieve historical map data, the historical map data describing coverage areas on a plurality of previous times; and
   generate, based on the historical map data, a graduated coverage area indicating a percentage of the previous times that each portion of the coverage area can be reached.

18. The system of claim 13, the computer circuitry further configured to:
   receive road closure data indicating that an AV cannot traverse at least one of the graph of connected lanes;
   remove at least one lane from the selected lanes along which an AV can stop based on the road closure data; and
   generate a revised coverage area based on the selected lanes with the at least one lane removed.

19. A non-transitory computer-readable medium storing instructions for determining and displaying a coverage area, the instructions, when executed by a processor, cause the processor to:
   select, from a map database storing data describing a set of connected roads each having one or more lanes, a plurality of lanes along which an AV can stop;
   generate a plurality of buffer regions, each buffer region corresponding to a respective lane of the plurality of lanes and comprising an area within a particular distance from the lane, each buffer region representing a respective area of a map, and each buffer region comprising the respective lane and a respective portion of the map outside of the respective lane;
   combine the plurality of buffer regions to generate a coverage area, the coverage area representing a combined area of the map, the coverage area including portions of the map outside the set of connected roads; and
   provide a display of at least a portion of the coverage area overlayed on the map, the map comprising roads corresponding to at least a portion of the set of connected roads in the map database.

20. The non-transitory computer-readable medium of claim 19, wherein selecting the plurality of lanes along which an AV can stop comprises:
   retrieving, from the map database, a routable graph comprising a plurality of connected lanes along which an AV can be routed; and
   filtering the routable graph to obtain the plurality of lanes along with the AV can stop, wherein the plurality of lanes is a subset of the plurality of connected lanes.

* * * * *